United States Patent [19]
van Seeters

[11] Patent Number: 5,824,901
[45] Date of Patent: Oct. 20, 1998

[54] CAPACITIVE SENSOR FOR MEASURING ACCELERATIONS AND INCLINATIONS

[75] Inventor: Josephus van Seeters, Balgach, Switzerland

[73] Assignee: Leica Geosystems AG, Heerbrugg, Switzerland

[21] Appl. No.: 703,430

[22] Filed: Aug. 26, 1996

Related U.S. Application Data

[63] Continuation-in-part of Ser. No. 285,626, Aug. 4, 1994, abandoned.

[30] Foreign Application Priority Data

Aug. 9, 1993 [DE] Germany .................... 43 26 666.5

[51] Int. Cl.⁶ .................................................. G01P 15/125
[52] U.S. Cl. .................................... 73/514.32; 73/514.36; 73/514.38; 73/514.12; 73/522; 361/280
[58] Field of Search .................. 73/514.01, 514.32, 73/514.35, 514.36, 514.38, 522, 514.12; 361/280

[56] References Cited

U.S. PATENT DOCUMENTS

| | | | |
|---|---|---|---|
| 3,876,916 | 4/1975 | Stoakes | 361/280 |
| 4,023,413 | 5/1977 | Stauber | 73/382 R |
| 4,435,737 | 3/1984 | Colton | 361/280 |
| 5,253,526 | 10/1993 | Omura et al. | 73/514.16 |
| 5,487,305 | 1/1996 | Ristic et al. | 73/514.32 |

FOREIGN PATENT DOCUMENTS

| | | |
|---|---|---|
| 0 395 922 | 11/1990 | European Pat. Off. |
| 0 480 047 | 4/1992 | European Pat. Off. |
| 0 547 742 | 6/1993 | European Pat. Off. |
| 25 23 446 | 9/1976 | Germany |
| 36 25 411 | 2/1988 | Germany |
| 41 07 366 | 4/1992 | Germany |

*Primary Examiner*—Hezron E. Williams
*Assistant Examiner*—Richard A. Moller
*Attorney, Agent, or Firm*—Foley & Lardner

[57] ABSTRACT

A capacitive sensor for measuring accelerations and inclinations with respect to the gravitational field. The capacitive sensor has at least one stator electrode and one displacement electrode, in which the position of the displacement electrode can change with respect to the stator electrode, thereby resulting in a change in capacitance. From this change of capacitance, an acceleration or inclination can be measured. The capacitive sensor is distinguished by the stator electrode being designed to have an annular shape and the displacement electrode is likewise formed by an annular element which is connected to a central surface part via resilient elastic webs, and wherein the central surface part is immovably connected to the sensor housing. Alternatively, the capacitive sensor may have the stator electrode and the displacement electrode formed as polygonal shapes. Air slot channels may also be included in the capacitive sensor so that air cushions that are built up as a result of sudden accelerations or inclinations will act as a temporary damper against vibrations in the electrodes, thereby reducing inaccuracies caused by these sudden fluctuations.

19 Claims, 3 Drawing Sheets

CAPACITIVE SENSOR FOR MEASURING ACCELERATIONS AND INCLINATIONS

RELATED APPLICATIONS

This application is a continuation-in-part of U.S. Ser. No. 08/285,626, entitled "Capacitive Sensor For Measuring Accelerations and Inclinations", filed Aug. 4, 1994, now pending.

BACKGROUND OF THE INVENTION

1. Field of the Invention

The invention relates to a capacitive sensor for measuring accelerations and inclinations with respect to the gravitational field.

2. Description of the Related Art

Sensors having a basic construction for measuring accelerations and inclinations with respect to the gravitational field are well known in the art. For example, see the disclosure of such sensors in German Patent Application DE-C 25 23 446 In these conventional sensors, a housing forms a stator part in which two electrode plates, called stator electrodes, are located opposite one another at a fixed distance. The electrode plates form circular surfaces. A resilient elastic membrane, or web, is clamped by its outer ring segment between these electrode plates in the housing. The central surface is constructed as an electrode and acts as a displaceable capacitor plate, also called a movable electrode.

The membrane electrode forms, with the respectively opposite stator electrodes, a capacitance which changes due to the displacement of the membrane electrode as a result of accelerations or inclinations and by which the accelerations or inclinations can thereby be measured by the respective changes in capacitance. A suitable circuit arrangement for measuring the change in capacitance is, for example, disclosed in German Patent Application DE-C 41 07 366.

The resilient elastic webs can be formed according to German Patent Application DE-C 25 23 446, previously mentioned above, by concentric slots, which are offset intermittently in the membrane or, according to European Patent Application EP-C 0 368 802 by helically-shaped slots.

German Patent Application DE-C 36 25 411 discloses a capacitive acceleration sensor having the same functional elements which are produced using microengineering production technology and etching techniques. The mutually opposite electrode surfaces are of a square shape, and the displacement part is held at the corners of the square by means of thin spring strips. A central displacement part having a square surface is also disclosed in European Patent Application EP-A 0 395 922 in which the webs are formed by polygonal slots which run parallel to the sides of the square.

In addition to the design of the capacitive sensor, the choice of material is also important for the construction of the capacitive sensor, since the parts which hold the electrodes have to be electrically insulated from each other. The elasticity of the displacement part is also largely dependent on the material with respect to hysteresis and aging processes. In addition to metallic parts used for the housing and the displacement part, glass, ceramic and silicon have been proposed in the previously mentioned European Patent Application EP-A 0 395 922.

The construction principle common to all capacitive sensors of the kind first mentioned above is that the displacement part is clamped along its outer circumference in the stator housing, to be symmetrically between two mutually opposite stator electrodes. The material chosen and the design are in this case to be constructively combined in such a manner that thermal and mechanical influences do not impair the precision of the zero position of the displacement part even during long-term operation. In addition, lateral vibrations and excessive elongations of the resilient elastic webs have to be prevented by means of additional fluidic or gas-pressure-dependent damping measures and mechanical displacement limitations. Known sensors therefore often consist of a multiplicity of parts which have to be carefully connected to each other and carefully adjusted with respect to each other.

The measurement principle common to all capacitive sensors of the kind first mentioned above relates to determining the change in capacitance which occurs during a shift of the displacement electrode in the direction of one of the stator electrodes. Only the acceleration components perpendicular to the plane of the electrodes can therefore be measured.

European Patent Application EP 0 547 742 A1 discloses a sensor which measures along three axes of acceleration. Three mutually parallel planes, which are provided with electrically conducting surface elements, are produced from a semiconductor material using microengineering production and etching techniques. The central plane is constructed as a membrane which is either hooked at its outer edge to resilient arms or is held in the center on a base. The resilient arms, starting from the center, hold the edge regions of the membrane in place. Due to the specific design of the membrane and the structure of the surface elements in the two further planes, a plurality of capacitive systems which are symmetrical to each other is produced. The symmetry of these systems defines a three-dimensional coordinate system. The acceleration-dependent shift of individual membrane areas in the capacitive systems results in signal components for each coordinate direction. The construction of the sensor is described as being relatively robust mechanically and sensitive in terms of measurement technique. The production, however, is very complex and requires specific process technologies.

SUMMARY OF THE INVENTION

The invention is therefore based on the object of providing an improved capacitive sensor. It is particularly an object of the invention to simplify the construction and the assembly of the sensor and to produce greater freedom in the choice of materials for the stator and displacement parts. In addition, it is an object to allow the sensor to be produced using conventional production and process technologies.

In accomplishing the foregoing objects, there has been provided in accordance with the present invention a capacitive sensor for measuring accelerations and/or inclinations with respect to a gravitational field, comprising: a stator part which forms a housing for the capacitive sensor; at least one fixed electrode attached to the stator part; a displacement part positioned opposite the fixed electrode; and a movable electrode attached to the displacement part, wherein the displacement part comprises a central surface and an outer ring-shaped segment, the central surface and the outer segment are connected together by resilient elastic webs, the at least one fixed electrode comprises a ring-shaped configuration, the movable electrode is formed by the outer ring-shaped segment, and the central surface of the displacement part is immovably connected to the housing.

In one preferred embodiment, the outer segment has a generally annular shape and the fixed electrode has a generally annular shape. In another embodiment, the outer segment has a generally polygonal shape and the fixed electrode has a generally polygonal shape. In the simplest embodiment only a single stator electrode is necessary.

Other objects, features, and advantages of the invention will be apparent to those skilled in the art from the following detailed description of preferred embodiments, when considered with the appended figures of drawing.

BRIEF DESCRIPTION OF THE DRAWINGS

Exemplary embodiments of the sensor according to the invention are shown in the drawings, in which.

DETAILED DESCRIPTION OF THE PREFERRED EMBODIMENTS

The invention is more fully described below with reference to these exemplary embodiments, the same functional elements being in each case provided in the figures with the same reference numbers.

Figure 1A:
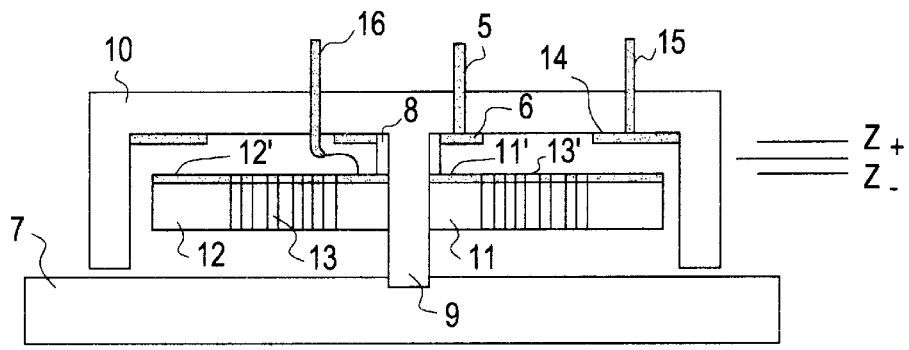
FIG. 1a shows a sectional view of a sensor having a centrally suspended displacement electrode situated on top of a ceramic displacement part opposite a single stator electrode, with a central peg of the housing being connected to a support plate, according to one embodiment of the invention.
Figure 1B:
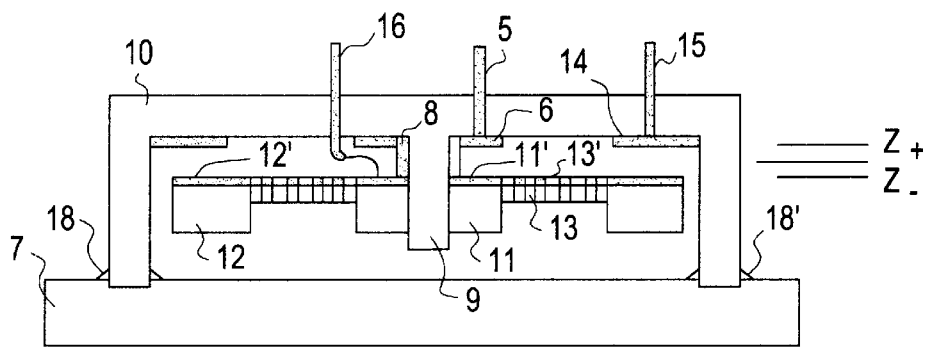
FIG. 1b shows a sensor having a centrally suspended displacement electrode opposite a single stator electrode, with ends of a housing being connected to a support plate, according to another embodiment of the invention.
Figure 1C:
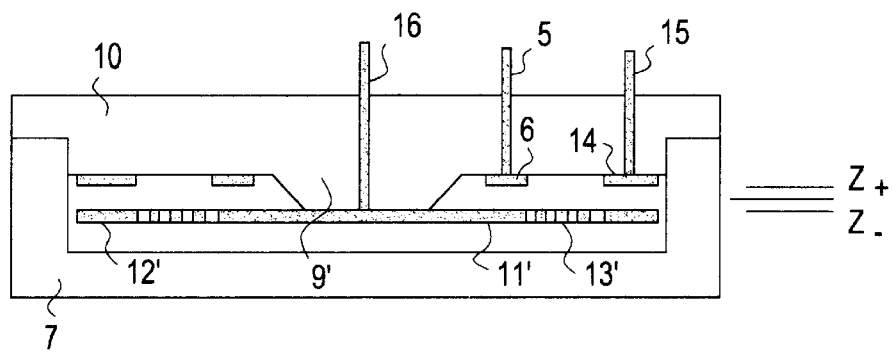
FIG. 1c shows a sensor in which a displacement part and a central surface are respectively formed by a displacement electrode and a central surface electrode itself, according to still another embodiment of the invention.

In FIGS. 1a, 1b and 1c, the housing 10 which forms the stator part is integrally produced from ceramic as a flat pot. A peg 9 projects out of the bottom, on which an electrically insulating spacing sleeve 8 is pushed or formed onto the peg 9 by means of a corresponding shoulder on the peg 9 (see FIGS. 1a and 1b). Referring now to FIGS. 1a and 1b, the central surface 11 is pushed over the peg 9 and firmly connected to the spacing sleeve 8 and the peg 9. The displacement electrode 12' is disposed on top of a displacement part 12, and the displacement electrode 12' is connected to a central surface electrode 11' which is disposed on top of the central surface 11. Resilient elastic webs 13 serve as the mechanical connection between the central surface 11 and displacement part 12. On the webs 13 there are disposed electrodes 13' which provide an electrical connection between the displacement electrode 12' and the central surface electrode 11'. The housing 10 can be glued or screwed into a groove in a support plate 7, as shown by glued areas 18, 18' in FIG. 1b. It is, however, also possible to extend the peg 9 and to insert it as the central mounting of the sensor housing 10 into the support plate 7, as shown in FIG. 1a. The edge of the housing 10 can then be suspended freely above the support plate 7, as shown in FIG. 1a, or in the grooves in the support plate 7, as shown in FIG. 1b. Possible distortions of the sensor housing 10 causing unwanted effects on the sensor electrodes are thereby minimized.

Referring now to FIGS. 1a and 1b, the displacement part 12, the central surface 11 and the resilient elastic webs 13 are preferably made of ceramic, while the displacement electrode 12', the central surface electrode 11' and the electrical connection 13' disposed on the resiliently elastic webs 13 are preferably constructed as a metal foil, with flexible parts etched onto the metal foil. The outer part of the metal foil would include the displacement electrode 12', and the inner part of the metal foil would include the central surface electrode 11'. FIG. 1c shows an embodiment with the displacement electrode 12', the resiliently elastic webs 13', and the central surface electrode 11' without the ceramic displacement part 12 and the ceramic central surface 11. A top surface of the central surface electrode 11' is affixed (i.e., glued) to a bottom surface of a peg 9' of the housing 10. The displacement electrode 12' is connected to the central surface electrode 11' via the resilient elastic webs 13', so that the displacement electrode 12' hangs freely. Accelerations and inclinations of a device to which the capacitive sensor is affixed to causes a movement of the displacement electrode 12' in the +Z/−Z direction.

On the bottom of the flat pot and opposite the displacement electrode 121, an external annular stator electrode 14 is arranged which is provided with an electrical connection 15. On the bottom of the flat pot and opposite the central surface electrode 11', another annular stator electrode 6 is arranged which is provided with an external electrical connection 5. A further electrical connection 16 establishes the power supply connection to the central surface electrode 11', and it also establishes the power supply connection to the displacement electrode 121 via an electrical connection established by way of the resiliently elastic webs 13'.

When the evaluation electronics are constructed carefully, the change in capacitance which occurs between the stator electrode 14 and the displacement electrode 12' can be measured directly in the case of a change in distance in the ±Z direction. It is, however, advantageous to start with a reference capacitance which represents the zero position of the displacement electrode 12' with respect to the stator electrode 14. This reference capacitance can be produced in a simple way by providing a further electrode surface 6 having an external electrical connection 5 that is fitted to the bottom of the flat pot around the peg and is situated above the central surface electrode 11', as seen in FIGS. 1a, 1b and 1c. In the case of a change in position of the displacement electrode 12' due to an acceleration or an inclination, for example, the capacitance formed by the electrode 6 and the central surface electrode 11' remains constant.

In FIGS. 1a and 1b, the necessary electrically conducting surfaces corresponding to the electrodes 11', 12', 13' are drawn more thickly in order to emphasize these in the case where the electrodes 11', 12' and 13' are situated on a ceramic material, such as parts 11 and 12, for example.

Figure 2A:
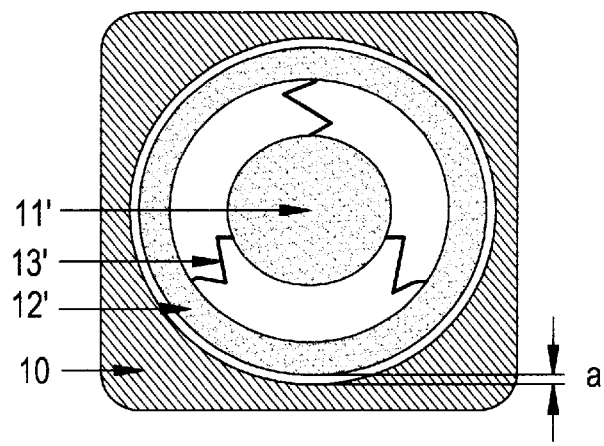
FIG. 2a shows a sensor having a centrally suspended displacement electrode, in the shape of a circular ring, and stator electrodes symmetrical thereto.

In FIG. 2a, the housing 10 is shown in plan view in the plane of the displacement electrode 12' and central surface electrode 11'. FIG. 2a shows generally circular central surface electrode 11', and an outer ring segment as displacement electrode 12', both being connected to one another via resilient elastic webs 13'. The distance "a" between the displacement electrode 12' and the housing wall is selected such that transverse displacements of the displacement electrode are limited to the degree which is mechanically permissible.

Figure 2B:
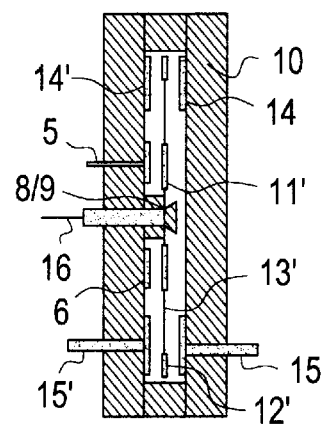
FIG. 2b shows a sectional view of the sensor of FIG. 2a, FIG. 3a shows a sensor having a centrally suspended displacement electrode in the shape of a square ring.

In the sectional view in FIG. 2b, the position of the stator electrodes 14, 14', which are arranged symmetrically to the displacement electrode 12' and form equal circular ring surfaces, can be seen. The two stator electrodes are provided with electrical connections 15, 15', which are passed out of the stator housing 10. If the housing consists of an electrically non-conducting ceramic, the connections 15, 15' can be passed directly through the housing wall, otherwise care has to be taken to provide sufficient electrical insulation with respect to the housing 10. The stator electrodes 14, 14' can be vapor-deposited or glued to the housing wall. In the case of a metallic housing, care has again to be taken as to appropriate insulation.

The displacement electrode 12' is situated within the housing 10 by way of the central surface electrode 11' being affixed to a peg 8/9 projecting out of the housing wall (see FIGS. 1a and 1b), or alternatively the displacement electrode 12' is situated within the housing 10 by way of the central surface electrode 11' being affixed to the trapezoidal-shaped peg 9' of the housing (see FIG. 1c), so that in the quiescent position the outer ring segment 12' is located symmetrically between the two stator electrodes 14, 14'. The electrical connection 16 to the displacement electrode 12' is carried out via the resiliently elastic webs 13' providing an electrical connection between the central surface electrode 11' and the displacement electrode 12'. That is, the resilient elastic webs 13 form the electrical connection between the central surface electrode 11' and the displacement electrode 12'. In the case of the embodiment with a ceramic displacement part 12 and the ceramic central surface part 11, as given in FIGS. 1a and 1b, the resiliently elastic webs 13 provide the mechanical connection between the central surface part 11 and the displacement part 12. Preferably, conduction paths between the central surface electrode 11' and the displacement electrode 12' are provided on both the top and bottom sides of these electrodes, by way of electrically conducting depositions 13' on the resiliently elastic webs 13.

Figure 3B:
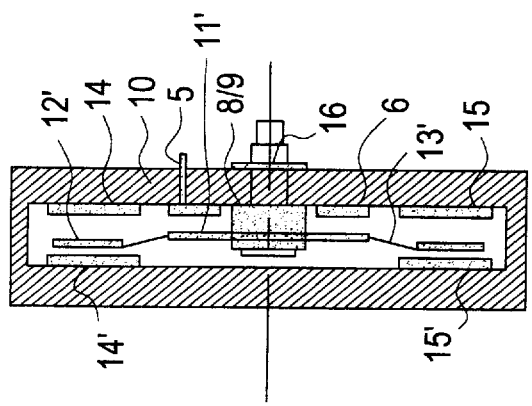
FIG. 3b shows a sectional view of the sensor of FIG. 3a, and FIG. 4 shows a sectional view of another sensor having a centrally suspended displacement electrode.
Figure 3A:
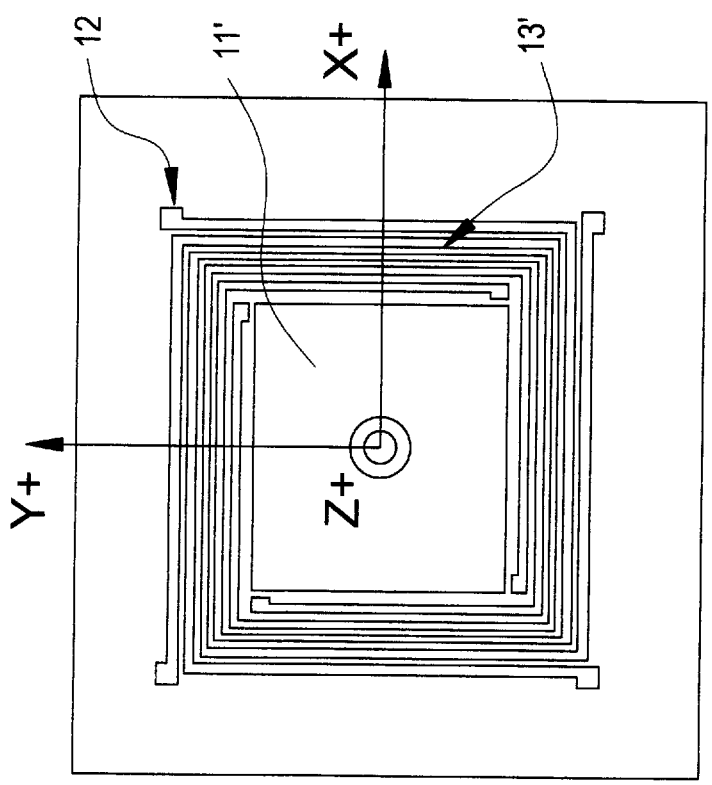

In FIG. 3a, a polygonal embodiment of the displacement part is shown, which in one preferred embodiment comprises a square shape. It consists, for example, of a CuBe film, where polygonal webs 13' have been etched out of the film. The sectional view in FIG. 3b shows the central fastening of the central surface electrode 11' to a peg 8/9 projecting from the housing 10, which results in a central placement of the displacement electrode 12' centrally between the sidewalls of the housing 10 in the Z direction, which is perpendicular to the central plane of the surface electrode 11'. Due to the geometry of the displacement electrode 12', transverse displacements in the direction perpendicular to the edges of the displacement electrode 12' are to be denoted X and Y; that is, in the plane of the drawing as positive towards the right and top, respectively.

The constructional advantages of the central positioning of the displacement electrode 12' via the fastening of the central surface electrode 11' can be seen in particular in the sectional views described. Different thermal expansion coefficients of the housing parts of the stator with respect to the displacement electrode 12' and central surface electrode 11' are practically no longer of any influence. Problems which arise from matching materials are thus removed. The housing parts can be formed from a single material. There are no intermediate layers of special insulating or other material for the displacement electrode. Due to the small clamping surface, the central suspension can be kept relatively free from stress and is easy to implement. It results in particular in advantageous possibilities to assemble the housing half and the displacement electrode 12'. The transverse movements of the displacement electrode 12' can be restricted mechanically, simply by the dimensions of the inner space of the housing.

Figure 4:
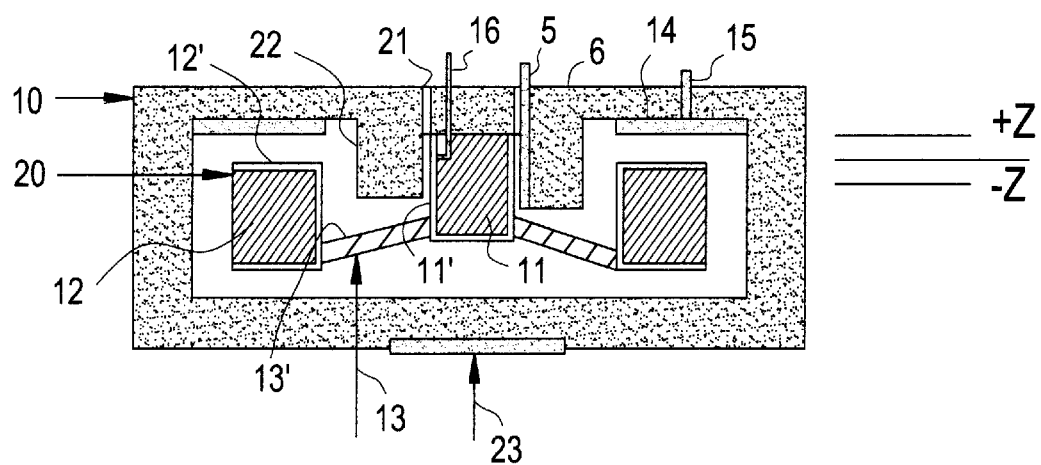

Further advantageous details are to be explained with reference to the exemplary embodiment shown in section in FIG. 4, which details are to be noted in the implementation of a sensor according to the invention. The mass ratio of the displacement part 12 with respect to the resilient elastic webs 13 is selected such that the displacement part 12 can in fact act as a seismic mass in the gravitational field. The outer circumferential surface 20 of the displacement part 12 is relatively large and produces a slot channel with respect to the inner housing wall. The air distances of all the surfaces of the displacement part 12 with respect to the inner housing walls are selected such that in the case of suddenly occurring shifts of the displacement part 12 due to vibrations or excessive accelerations, the air which is in the gaps can only escape against an effective flow resistance. The air cushion which is thus built up temporarily acts as a damper against vibrations and, interacting with the spring constant of the webs 13, serves as an overload protection for the displacement part 12. In the case of extreme requirements, a liquid can also be used for damping. Venting holes 21 in the stator housing 10 serve to prevent barometrical effects.

The peg for fastening the central surface 11 to the housing 10 and also for holding the displacement part 12 in a central quiescent position within the housing 10 via the resiliently elastic webs 13 is surrounded by a higher cylindrical housing part 22 which is situated to reduce possible stray capacitances with respect to the other electrodes in the housing 10 and establishes a narrow air gap with respect to the seismic mass of the displacement part 12 also in this place. In the case of a metallic housing, a special conducting fastening surface 23 generates a defined electrical potential.

For effective overload protection of the displacement part 12, the spring constant of the webs 13 should be designed such that the displacement which occurs during normal operational conditions and the highest possible displacement have a ratio of smaller than 1:5.

For a stable and precise determination of the capacitance by means of a current measurement, as described in the already mentioned DE-C 41 07 366, a signal line is fed to the sensor via the electrical connection 16.

While preferred embodiments of the invention have been described, modifications of the described embodiments may become apparent to those of ordinary skill in the art, following the teachings of the invention, without departing from the scope of the present invention as set forth in the appended claims.

What is claimed is:

1. A capacitive sensor for measuring accelerations and/or inclinations with respect to a gravitational field, comprising:

a stator part which forms a housing for said capacitive sensor;

a first fixed electrode attached to said stator part;

a displacement part comprising a central surface and an outer-ring segment, said outer-ring segment being positioned opposite said first fixed electrode, said central surface being electrically conducting;

a second fixed electrode surface attached to said stator part, said central surface of said displacement part being positioned opposite said second fixed electrode; and a movable electrode attached to said outer-ring segment of said displacement part, wherein said central surface and said outer ring-shaped segment are connected together by resilient elastic webs, said first and second fixed electrodes each comprise a ring-shaped configuration with said second fixed electrode being concentric with and encompassing said first fixed electrode, said movable electrode is formed by said outer ring-shaped segment, said central surface of said displacement part is immovably connected to said housing, and said outer ring-shaped segment is capable of movement with respect to said housing, and wherein a fixed reference capacitance is formed between said second fixed electrode and said central surface of said displacement part, and a displacement capacitance is formed between said first fixed electrode and said outer ring-shaped segment of said displacement part.

2. A capacitive sensor as claimed in claim 1, wherein said outer ring-shaped segment has a generally annular shape and said first and second fixed electrodes each have a generally annular shape.

3. A capacitive sensor as claimed in claim 2, wherein said movable electrode has a cylindrical circumferential surface.

4. A capacitive sensor as claimed in claim 3, wherein a narrow air gap, acting as a flow resistance, exists between said cylindrical circumferential surface of said movable electrode and a wall of said housing.

5. A capacitive sensor as claimed in claim 2, wherein an entire circular bottom surface of said second fixed electrode faces an entire circular top surface of said central surface of said displacement part.

6. A capacitive sensor as claimed in claim 5, wherein an entire circular bottom surface of said first fixed electrode faces an entire circular top surface of said outer-ring segment of said displacement part.

7. A capacitive sensor as claimed in claim 1, wherein said outer ring-shaped segment has a generally polygonal shape and said first and second fixed electrodes each have a generally polygonal shape.

8. A capacitive sensor as claimed in claim 3, wherein said movable electrode has a cylindrical circumferential surface.

9. A capacitive sensor as claimed in claim 1, wherein said housing has a top surface and a bottom surface, said first fixed electrode being attached to said top surface of said housing, said capacitive sensor further comprising a third fixed electrode attached to said bottom surface of said housing and opposite said central-ring segment, wherein said central-ring segment of said displacement part is positioned between said first and third fixed electrodes, and wherein a second displacement capacitance is formed between said third fixed electrode and said outer ring-shaped segment of said displacement part.

10. A capacitive sensor as claimed in claim 1, wherein a maximum displacement of said movable electrode and a normal displacement of said movable electrode against a spring force of said webs, wherein said normal displacement occurs under normal operating conditions, are limited by an appropriate selection of a spring constant for said webs such that a ratio of said maximum displacement to said normal displacement is smaller than about 5:1.

11. A capacitive sensor as claimed in claim 1, wherein an electrical connection is established from outside of said housing to said movable electrode, said electrical connection having a first end positioned at a location outside of said housing and having a second end connected to a wire that is attached to at least one of said elastic webs, said wire being connected to said movable electrode, and wherein said electrical connection provides an electrical signal for measuring the accelerations and/or inclinations.

12. A capacitive sensor as claimed in claim 1, further comprising a support plate attached to the housing, wherein said housing includes a central peg by which said central part is attached thereto, and wherein said housing is attached to said support plate only through said central peg.

13. A capacitive sensor as claimed in claim 1, further comprising a support plate attached to the housing, wherein said housing includes a central peg by which said central part is attached thereto, and a first and a second end portion disposed on opposite sides of said central peg, and wherein said housing is attached to said support plate only through said first and second end portions.

14. A capacitive sensor as claimed in claim 1, wherein the first and second fixed electrodes are disposed in a substantially coplanar relationship on said stator part.

15. A capacitive sensor as claimed in claim 1, wherein said stator part includes a top wall on which said first fixed electrode and said second fixed electrode are disposed, wherein said stator part also includes a central peg extending downward from a substantially central position of said top wall, and wherein said displacement part is connected to said central peg at a position on said central peg that is between a top portion and a bottom portion of said central peg.

16. A capacitive sensor as claimed in claim 15, wherein said central peg has a trapezoidal shape.

17. A capacitive sensor for measuring accelerations and/or inclinations with respect to a gravitational field, comprising:

a housing having a top wall, an inner peg having a first length extending downward from the top wall, and an outer wall having a second length extending downward in a substantially parallel relationship with respect to the inner peg, the inner peg being connected to the top wall at a substantially central position of the top wall, the first length being less than the second length;

a support plate connected to the housing only through the outer wall to form a chamber between the support plate and the housing, wherein an air gap exists between a bottom surface of the inner peg and a top surface of the support plate that faces the bottom surface of the inner peg;

a center portion positioned on the inner peg, the center portion having a top surface positioned closest to the top wall in which a first reference electrode is attached thereon, the top wall having a second reference electrode positioned opposite the first reference electrode to form a reference capacitance therebetween;

a plurality of elastic webs having respective first ends connected to the center portion and having respective second ends; and a displacement portion connected to the respective second ends of the plurality of elastic webs, the displacement portion having a top surface positioned closest to the top wall in which a displacement electrode is attached thereon, the top wall having a third reference electrode positioned opposite the displacement electrode to form a variable capacitance therebetween, the third reference electrode having one edge abutting the outer wall, wherein connection of the displacement portion to the elastic webs allows for variation in a distance between the displacement electrode and the third reference electrode, and wherein a difference in capacitance between the variable capacitance and the reference capacitance allows for the measuring of accelerations and/or inclinations.

18. A capacitive sensor as claimed in claim 17, wherein the first, second, and third reference electrodes and the displacement electrode each have a generally annular ring shape.

19. A capacitive sensor as claimed in claim 17, wherein the reference capacitance represents a non-acceleration and non-inclination position of the variable capacitance.

* * * * *